(12) United States Patent
Coates

(10) Patent No.: US 9,630,778 B1
(45) Date of Patent: Apr. 25, 2017

(54) COMPRESSIVE BARRED BRACKETS

(71) Applicant: Ross M. Coates, Casper, WY (US)

(72) Inventor: Ross M. Coates, Casper, WY (US)

( * ) Notice: Subject to any disclaimer, the term of this patent is extended or adjusted under 35 U.S.C. 154(b) by 0 days.

(21) Appl. No.: 14/925,426

(22) Filed: Oct. 28, 2015

(51) Int. Cl.
*B65G 7/12* (2006.01)

(52) U.S. Cl.
CPC ..................................... *B65G 7/12* (2013.01)

(58) Field of Classification Search
CPC .... B65G 7/12; A45F 5/10; B66C 1/48; B66C 1/422; B66C 1/442
USPC .......................................... 294/16, 118, 164
See application file for complete search history.

(56) References Cited

U.S. PATENT DOCUMENTS

| | | | |
|---|---|---|---|
| 211,855 A | 2/1879 | Kinzer | |
| 618,873 A | 2/1899 | Harper | |
| 1,279,877 A * | 9/1918 | Kempthorne | ............. B25B 7/02 |
| | | | 294/164 |
| 1,436,234 A * | 11/1922 | Burt | ..................... B65D 23/104 |
| | | | 294/164 |
| 1,862,539 A | 6/1932 | Johnson | |
| 2,029,809 A * | 2/1936 | Connolly | ................... A45F 5/10 |
| | | | 294/28 |
| 2,337,580 A * | 12/1943 | Webster | .................. A47J 45/10 |
| | | | 24/30.5 R |
| 2,561,374 A | 7/1951 | Igbe | |
| 2,716,516 A * | 8/1955 | Weston | ...................... A45F 5/10 |
| | | | 294/165 |
| 2,747,917 A * | 5/1956 | Smith | ..................... A01G 21/00 |
| | | | 294/116 |
| 2,786,709 A | 3/1957 | Wirkkala | |
| 8,376,429 B2 * | 2/2013 | Hager | ...................... A47J 45/10 |
| | | | 294/118 |
| 2014/0333080 A1 * | 11/2014 | Dvorscak | ................. B25B 7/00 |
| | | | 294/118 |

\* cited by examiner

*Primary Examiner* — Dean Kramer
(74) *Attorney, Agent, or Firm* — Schwartz, Bon, Walker & Studer, LLC; Peter J Timbers

(57) ABSTRACT

A compression apparatus for gripping and carrying objects having walls is provided. The apparatus comprises the two U-shaped brackets, one U-shaped having a handle and an upper and a lower rounded bars at the bottom of the bracket and the other U-shaped bracket having a handle and a single rounded bar. When the apparatus handle portion comes together, the single rounded bar fits at least partially between the upper and lower rounded bars. During compressive use an object's walls would be squeezed and gripped between the upper and lower rounded bars and the single rounded bar.

12 Claims, 7 Drawing Sheets

COMPRESSIVE BARRED BRACKETS

FIELD OF THE INVENTION

This invention relates generally to a compression apparatus to aid in the gripping of walled objects.

BACKGROUND OF THE INVENTION

Lifting and carrying heavy objects, especially bags, can be difficult. It can often be complicated to secure an effective gripping position. Frequently, when one seeks effectively to grab and handle a bag for manual lifting and transporting, the bag walls rip. Thus, a lifter and carrier of bags must concentrate on grabbing, handling, lifting and carrying a heavy bag or object as opposed to transporting the walled object or bag. There are not effective tools to accommodate the lifting of walled bags and objects. The tools that do exist may pierce or tear the walls of the objects. Thus, there is a long felt need for to provide a means to grip walled objects with uniformity in order to maintain the integrity of the walled object.

SUMMARY OF THE INVENTION

Accordingly, it is an object of various embodiments of the present invention to provide hingedly connected compressive barred brackets, which enable a user to squeeze two handles together at the upper portion of the invention and simultaneously compress the walls of a bag or other object via the lower portion of the invention.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims. To achieve the foregoing and other objects, and in accordance with the purposes of the present invention, as embodied and broadly described herein, the invention comprises a compression apparatus comprising a first U-shaped bracket, a second U-shaped bracket and at least one attachment pin that hingedly that connects the first U-shaped bracket and the second U-shaped bracket, the first U-shaped bracket comprising a handle having two ends, two opposing lever arms disposed at both ends of said handle, each of said opposing lever arms comprising an upper portion, a middle portion, a lower portion, a first curvature disposed between the upper portion and the middle portion, a second curvature disposed between the middle portion and the lower portion, and an upper rounded bar and a lower rounded bar attached to the lower portions of said lever arms, the second U-shaped bracket comprising a handle, two opposing lever arms disposed at either end of said handle, each of said opposing lever arms comprising an upper portion, a middle portion, a lower portion, a first curvature disposed between the upper portion and the middle portion, a second curvature disposed between the middle portion and the lower portion, and one rounded bar attached to the lower portions of said lever arms, each of the middle portions of the lever arms of the first U- and the second U-shaped bracket has a pin hole and the at least one attachment pin pierces the pin holes in the middle portions of the lever arms of the first U-shaped bracket and second U-shaped bracket.

In another embodiment of the instant invention, the invention comprises a compression apparatus comprising a first U-shaped bracket, a second U-shaped bracket and at least one attachment pin that hingedly that connects the first U-shaped bracket and the second U-shaped bracket, the first U-shaped bracket comprising a handle having two ends, two opposing lever arms disposed at both ends of said handle, each of said opposing lever arms comprising an upper portion, a middle portion, a lower portion, a first curvature disposed between the upper portion and the middle portion, a second curvature disposed between the middle portion and the lower portion, and an upper rounded bar and a lower rounded bar attached to the lower portions of said lever arms, the second U-shaped bracket comprising a handle having two ends, two opposing lever arms disposed at either end of said handle, each of said opposing lever arms comprising an upper portion, a middle portion, a lower portion, a first curvature disposed between the upper portion and the middle portion, a second curvature disposed between the middle portion and the lower portion, and one rounded bar attached to the lower portions of said lever arms, each of the middle portions of the lever arms of the first U-shaped bracket and the second U-shaped bracket has a pin hole and the at least one attachment pin pierces the pin holes in the middle portions of the lever arms of the first U-shaped bracket and second U-shaped bracket.

Benefits and advantages of the present invention include, but are not limited to, providing a means to compress a grip around an object having walls in order to more easily lift the object.

BRIEF DESCRIPTION OF THE DRAWINGS

The invention can be best understood by those having ordinary skill in the art by reference to the following detailed description when considered in conjunction with the accompanying drawings in which.

DETAILED DESCRIPTION OF THE INVENTION

Figure 1:
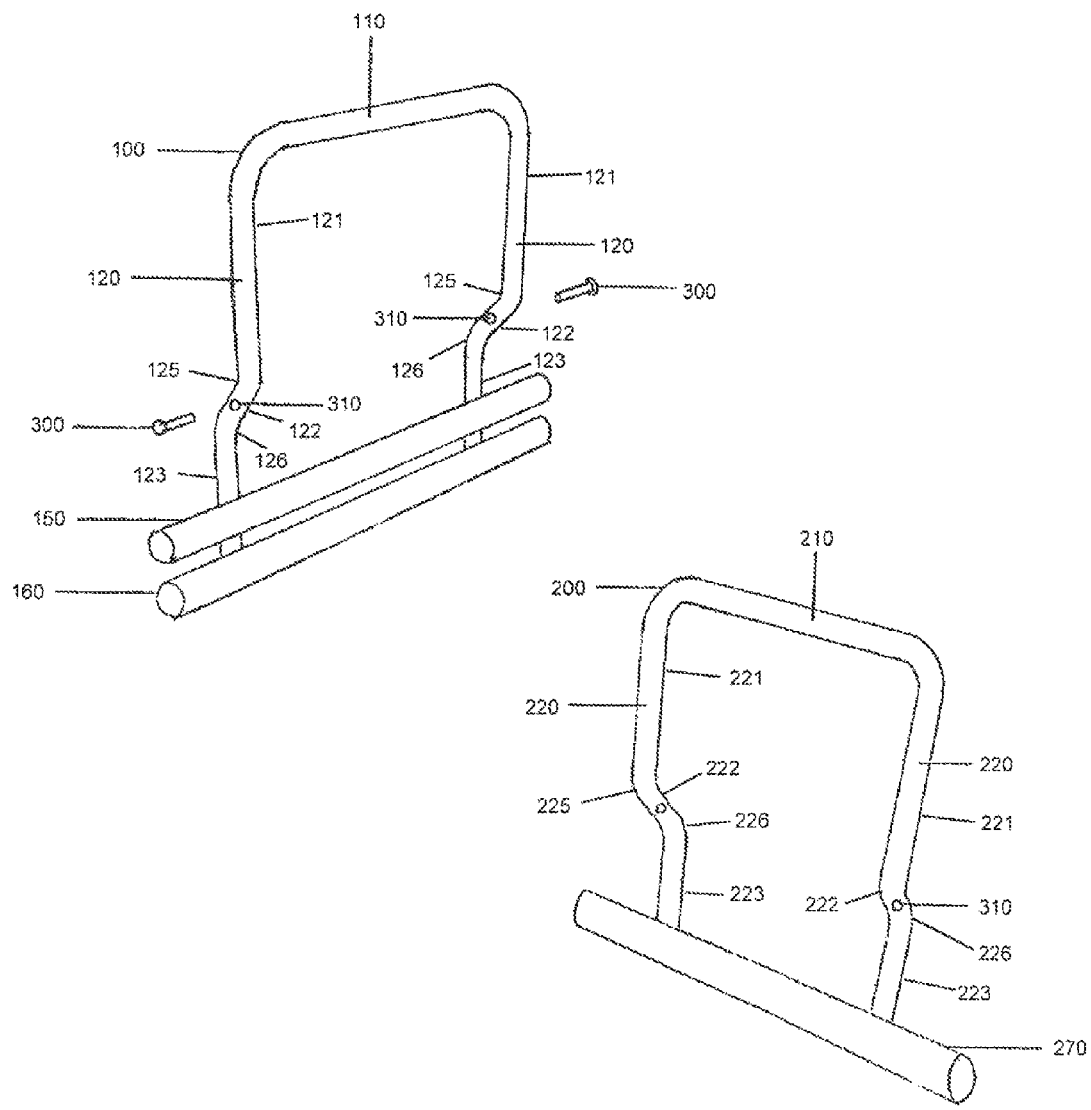
FIG. 1 illustrates a perspective view one embodiment of the instant invention comprising a first U-shaped bracket having two bars at the bottom of its lever arms and a second U-shaped bracket having one rounded bar at the bottom of its lever arms.

Reference will now be made in detail to embodiments of the invention, examples of which are illustrated in the accompanying drawings. Throughout the following detailed description, the same reference characters refer to the same or similar elements in all figures.

At the top left portion of FIG. 1, there is a portion of one embodiment of the compression apparatus comprising a first U-shaped bracket 100 having a handle 110 and two lever arms 120 on opposing sides of the handle 110. Also depicted along the mid section 122 of the lever arms are pin holes 310 and attachment pins 300. Further, there are two curvatures 125 and 126 in the U-shaped bracket, with the pin holes 310 between the first curvature 125, a roughly 135 degree curve, and the second curvature 126, a roughly 45 degree curve. The first curvature 125 separates the middle portion 122 from the upper portion 121 of the lever arm 120. The second curvature 126 separates the middle portion 122 from the lower portion 123 of the of the lever arm 120. The pin holes 310 are disposed in the middle portions 122 of the lever arms and adapted to receive the attachment pins 300. An upper rounded bar 150 is attached to the bottom portion 123 and disposed above the bottom rounded bar 160, which is also attached to the bottom portion 123 of the lever arms 120.

At the bottom right portion of FIG. 1, there is a portion of one embodiment of the compression apparatus comprising a first U-shaped bracket 200 having a handle 210 and two lever arms 220 on opposing sides of the handle 210. Also depicted along the mid section 222 of the lever arms are pin holes 310 and attachment pins 300. Further, there are two curvatures 225 and 226 in the U-shaped bracket, with the pin holes 310 between the first curvature 225, a roughly 135 degree curve, and the second curvature 226, a roughly 45 degree curve. The first curvature 225 separates the middle portion 222 from the upper portion 221 of the lever arm 220. The second curvature 226 separates the middle portion 222 from the lower portion 223 of the of the lever arm 220. The pin holes 310 are disposed in the middle portions 222 of the lever arms and made to receive the attachment pins 300. A single rounded bar 270 is attached to the bottom portion 223.

Figure 2:
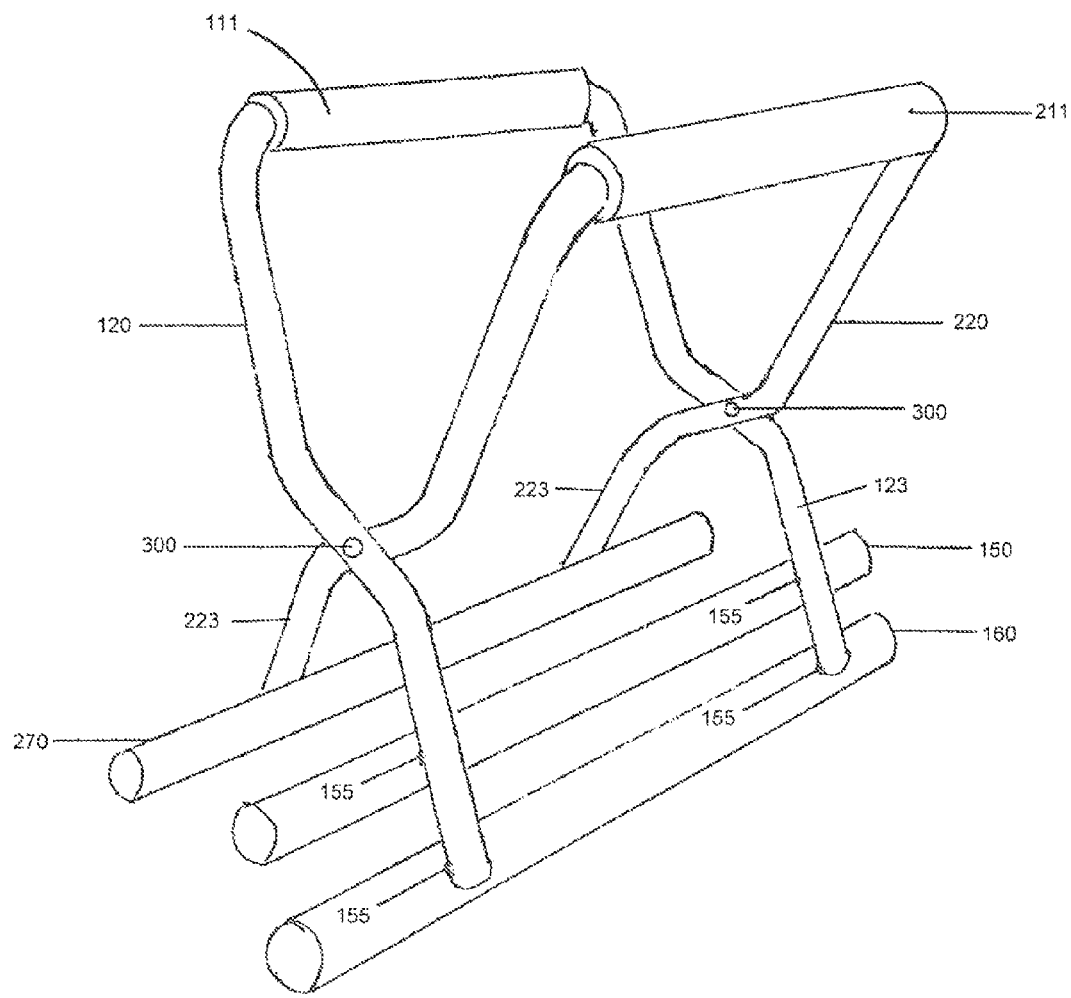
FIG. 2 illustrates a side perspective view of one embodiment of the instant invention wherein the two U-shaped brackets are secured by two attachment pins and the invention is non-compressed.

FIG. 2 is one embodiment of the compression apparatus invention, which shows the first U-shaped bracket 120 attached to the second U-shaped bracket 220 attached via attachment pins 300. The welds 155 attach the upper rounded rod 150 to the bottom portion 123 of the lever arm 120. Similar welds 155 are attach the lower rounded rod 160 to the bottom portion 123 of the lever arm 120.

Figure 3:
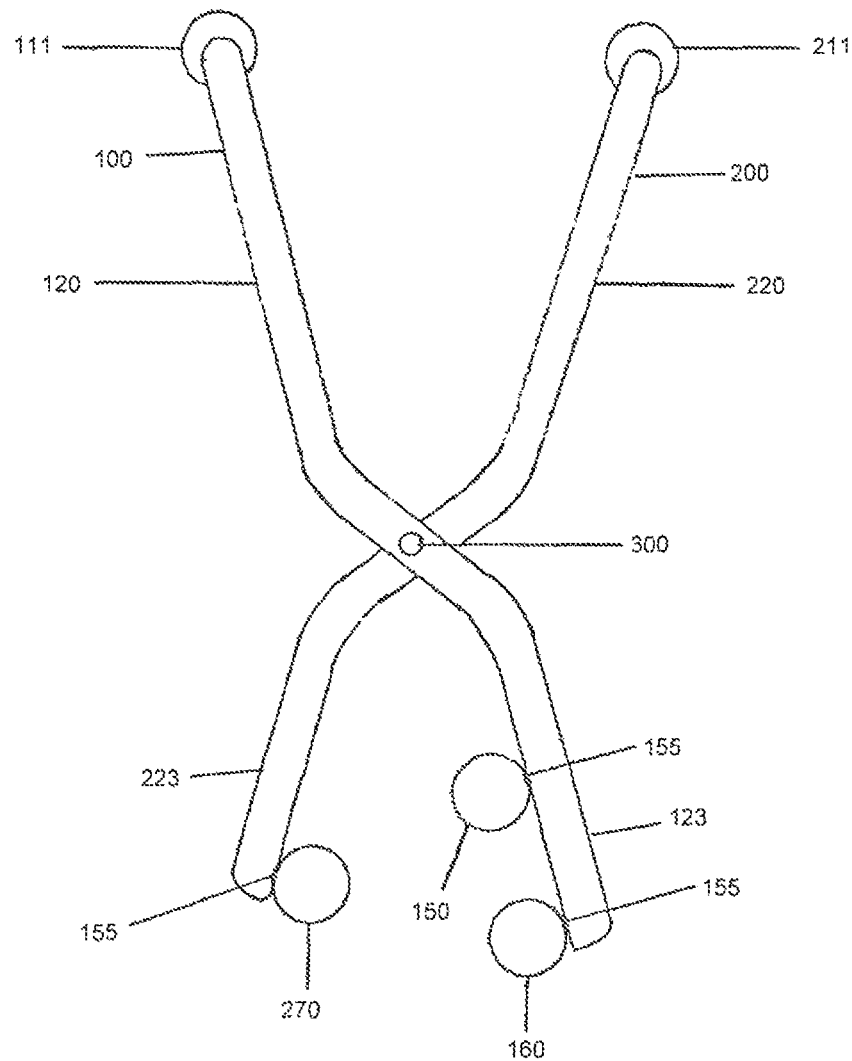
FIG. 3 illustrates a side planar view of one embodiment of the instant invention wherein the two U-shaped brackets are secured by two attachment pins and the invention is non-compressed.

FIG. 3 is one embodiment of the compression apparatus invention, which shows the first U-shaped bracket 120 attached to the second U-shaped bracket 220 attached via attachment pins 300. The welds 155 attach the upper rounded rod 150 to the bottom portion 123 of the lever arm 120. Similar welds 155 attach the lower rounded rod 160 to the bottom portion 123 of the lever arm 120 of the first U-shaped bracket 100. Again, similar welds 155 attach rounded bar 270 to one of the bottom portion 223 of the one of the lever arms 220 of the second U-shaped bracket 200. The embodiment of the invention shown in FIG. 3 demonstrates the compression apparatus in an open or non-compressed position. The lever arms 120 and 220 are attached via attachment pins 300, which form the fulcrum or pivot point of the lever arms.

Figure 4:
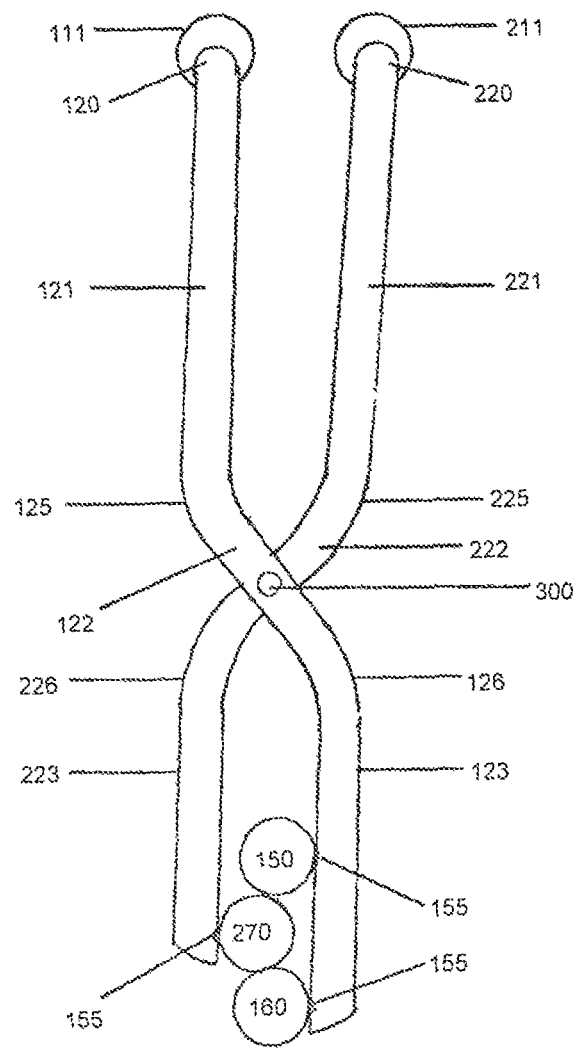
FIG. 4 illustrates a side planar view of one embodiment of the instant invention wherein the two U-shaped brackets are secured by two attachment pins and the invention is compressed.

FIG. 4 depicts one embodiment of the instant invention in the closed position wherein the handles covered by grips 211 and 111 have been brought close in close proximity to each other. Corresponding to the handles and upper portions of the lever arms being in close proximity to each other, the lower portions 123 and 223 of the lever arms come closer to each other. In the closed position and without walls of an object being between the lower portions 123 and 223 of the lever arms, the upper rounded rod 150 and lower rounded rod 160, which are separated, come into contact with the single rounded bar 270.

The upper portions 121 of the lever arms of the first U-shaped bracket are parallel to the lower portion 123 of the first U-shaped bracket. Also, in the closed position the upper portions 121 of the first U-shaped bracket are co-linear with the lower portions 223 of the second U-shaped bracket. Similarly, the upper portions 221 of the lever arms of the second U-shaped bracket are parallel to the lower portion 223 of the second U-shaped bracket. Also, in the closed position the upper portions 221 of the second U-shaped bracket are co-linear with the lower portions 123 of the first U-shaped bracket.

FIG. 4 also depicts the rounded bars in a configuration wherein each rounded bars is parallel to the other rounded bars. Additionally, as depicted in FIG. 4, the rounded bars are perpendicular to the lever arms.

Figure 5:
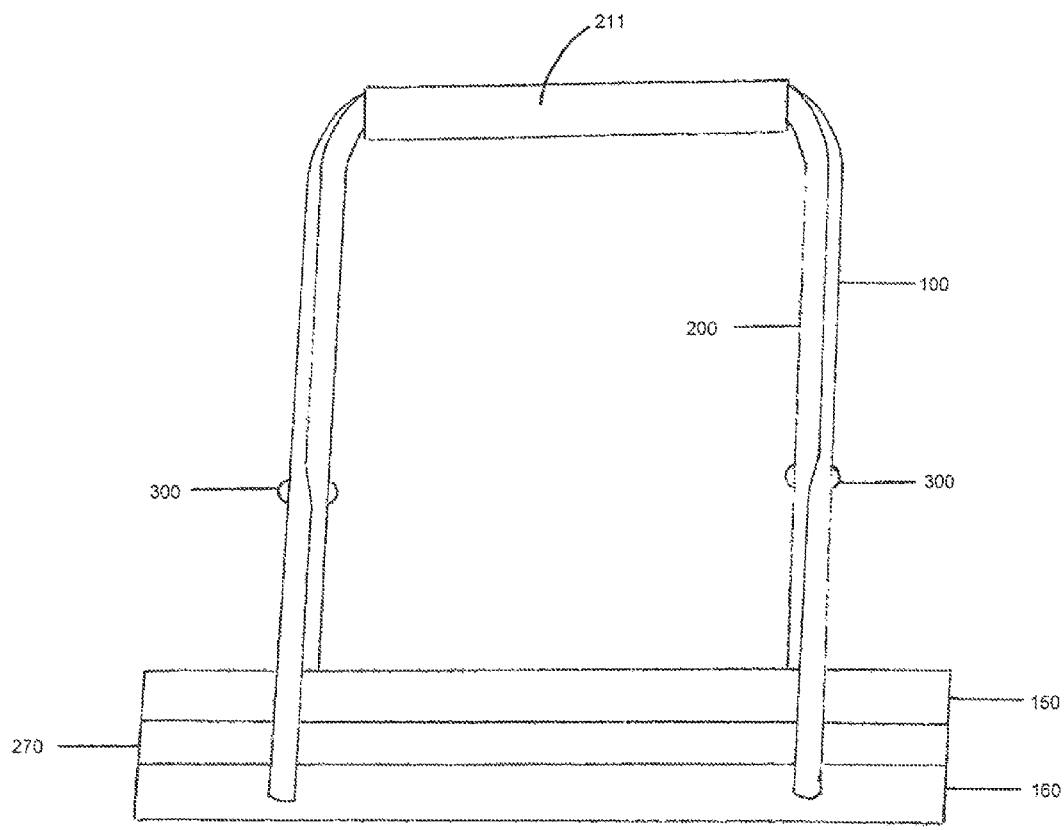
FIG. 5 illustrates a front planar view of one embodiment of the instant invention.

FIG. 5 depicts a planar side view of one embodiment of the instant invention in the closed position. The single rounded rod 270 of the second U-shaped bracket partially fits between the upper rounded rod 150 and the lower rounded rod 160 of the first U-shaped bracket. The attachment pins 300 connect the first U-shaped bracket 100 and the second U-shaped bracket 200 and form a pivot point for the lever arms of the U-shaped brackets.

Figure 6:
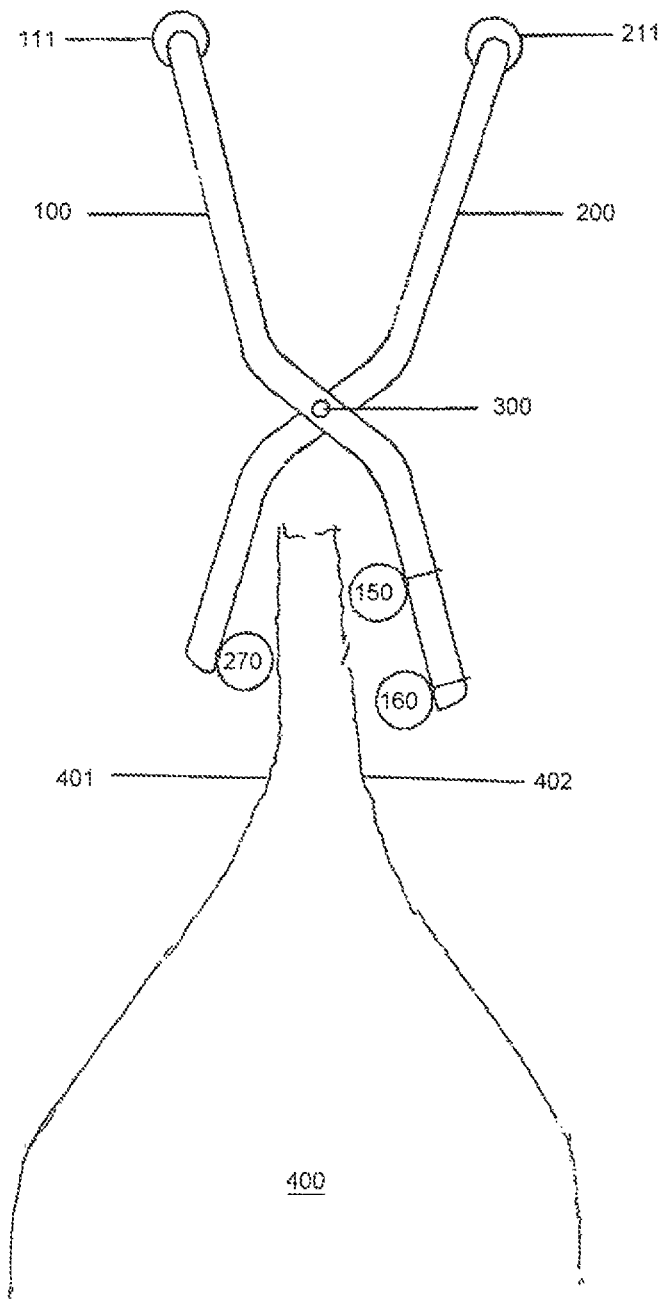
FIG. 6 illustrates a side planar view of one embodiment of the instant invention wherein apparatus lever arms are separated and an object is placed between the lower lever arms prior to compression.

FIG. 6 depicts the compression apparatus in an open position with a bag object 400 having walls 401 and 402 disposed between the upper rounded rod 150 and lower rounded rod 160 of the first U-shaped bracket 100 and the single rounded rod 270 of the second U-shaped bracket 200. As the handles of the U-shaped brackets are bought in close proximity to each other during a closing manipulation, the lower portions close in around the walls 401 and 402 of the object 400.

Figure 7:
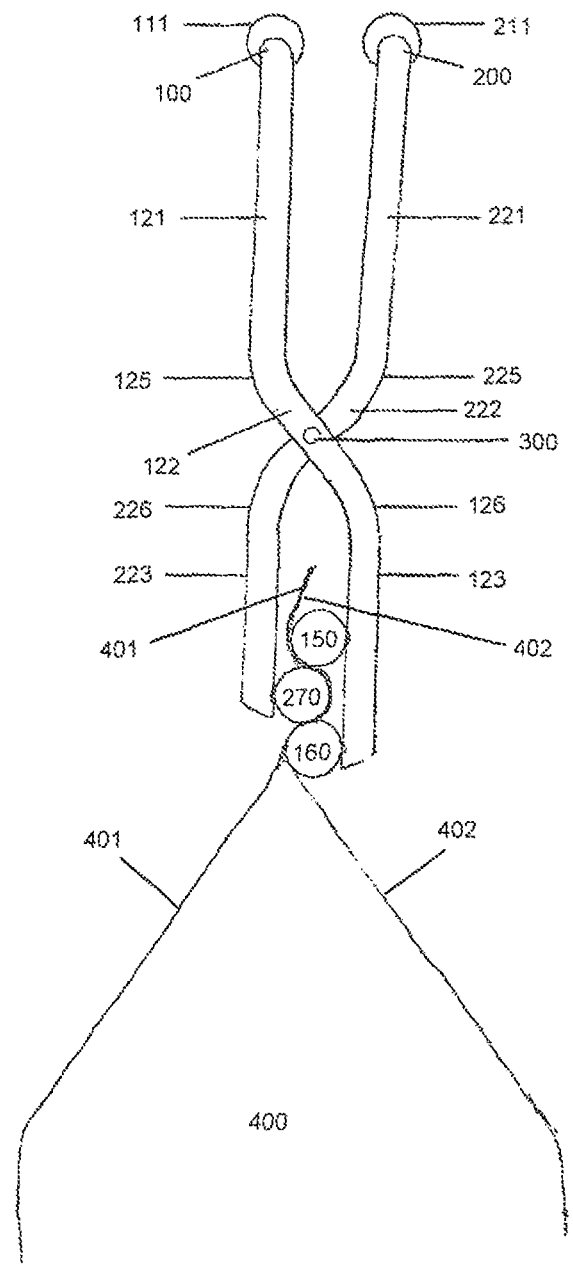
FIG. 7 illustrates a side planar view of one embodiment of the instant invention wherein apparatus lever arms are brought together and the object placed between the lower lever arms is compressed and able to be lifted with the instant invention.

FIG. 7 depicts the compression apparatus gripping the object 400 by the upper portions of its walls 401 and 402. The rounded bars provide a smoother surface to grip and reduce tearing of the walls of the object by allowing for more points of contact. A user closes the compression apparatus by squeezing the grips 111 and 211 covering the handles at the upper portion of one embodiment of the instant invention and is thereby able to grip the walled object and carry it having the weight of the object more even dispersed over the walls of the object. The gripping occurs via the single rounded bar pushing in opposition to the upper and lower rounded bars, gripping the walled object in a vice-like manner. The resultant weight distribution allows the used to pick up bags having plastic and paper walls and weighing up to 100+ pounds with one hand grasping the handle portions of the instant invention.

It is believed that the apparatus of the present invention and many of its attendant advantages will be understood from the foregoing description. It is also believed that it will be apparent that various changes may be made in the form, geometry, construction, and arrangement of the components without departing from the scope and spirit of the invention and without sacrificing its material advantages. The forms described are merely exemplary and explanatory embodiments thereof. It is the intention of the following claims to encompass and include such changes.

What is claimed is:

1. A compression apparatus comprising a first U-shaped bracket, a second U-shaped bracket and at least one attachment pin that hingedly connects the first U-shaped bracket and the second U-shaped bracket, the first U-shaped bracket comprising a handle having two ends, two opposing lever arms disposed at each end of said handle, each of said opposing lever arms comprising an upper portion, a middle portion, a lower portion, a first curvature disposed between the upper portion and the middle portion, a second curvature disposed between the middle portion and the lower portion, and an upper rounded bar and a lower rounded bar attached to the lower portions of said lever arms, the second U-shaped bracket comprising a handle having two ends, two opposing lever arms disposed at each end of said handle, each of said opposing lever arms comprising an upper portion, a middle portion, a lower portion, a first curvature disposed between the upper portion and the middle portion, a second curvature disposed between the middle portion and the lower portion, and one rounded bar attached to the lower portions of said lever arms, each of the middle portions of the lever arms of the first U-shaped bracket and the second U-shaped bracket has a pin hole, and the at least one attachment in penetrates the pin holes in the middle portions of the lever arms of the first U-shaped bracket and the second U-shaped bracket, the two upper portions of each of the lever arms of the first U-shaped bracket are parallel to the two lower portions of the first U-shaped bracket and the two upper portions of each of the lever arms of the second U-shaped bracket are parallel to the two lower portions of the second U-shaped bracket and the two rounded bars of the first U-shaped bracket contact the one rounded bar of the second U-shaped bracket when the lower portions and the handles of the U-shaped brackets are bought together.

2. The compression apparatus of claim 1, wherein the upper portions of the first U-shaped bracket are co-linear with the bottom portions of the second U-shaped brackets, when the compression apparatus is closed and the handles are brought together.

3. The compression apparatus of claim 1, wherein the upper portions of the second U-shaped bracket are co-linear with the bottom portions of the first U-shaped brackets when the compression apparatus is closed and the handles are brought together.

4. The compression apparatus of claim 1, wherein the first curvature comprises roughly a 135 degree bend and the second curvature comprises a roughly 45 degree bend with regard to both the first and second U-shaped bracket.

5. The compression apparatus of claim 1, wherein the compression apparatus hingedly opens and closes by opening and closing the handles and placing a walled object between the bottom portions of the first and second U-shaped brackets, which are correspondingly separated and brought closer together.

6. The compression apparatus of claim 1, wherein the rounded bars are parallel to each other.

7. The compression apparatus of claim 1, wherein the rounded bars are perpendicular to the lever arms.

8. A compression apparatus comprising a first U-shaped bracket, a second U-shaped bracket and at least one attachment pin that hingedly connects the first U-shaped bracket and the second U-shaped bracket, the first U-shaped bracket comprising a handle having two ends, two opposing lever arms disposed at both ends of said handle, each of said opposing lever arms comprising an upper portion, a middle portion, a lower portion, a first curvature disposed between the upper portion and the middle portion, a second curvature disposed between the middle portion and the lower portion, and an upper rounded bar and a lower rounded bar attached to the lower portions of said lever arms, the second U-shaped bracket comprising a handle having two ends, two opposing lever arms disposed at either end of said handle, each of said opposing lever arms comprising an upper portion, a middle portion, a lower portion, a first curvature disposed between the upper portion and the middle portion, a second curvature disposed between the middle portion and the lower portion, and one rounded bar attached to the lower portions of said lever arms, each of the middle portions of the lever arms of the first U-shaped bracket and the second U-shaped bracket has a pin hole and the at least one attachment pin pierces the pin holes in the middle portions of the lever arms of the first U-shaped bracket and second U-shaped bracket, the two upper portions of each of the lever arms of the first U-shaped bracket are parallel to the two lower portions of the first U-shaped bracket and the two upper portions of each of the lever arms of the second U-shaped bracket are parallel to the two lower portions of the second U-shaped bracket and the two rounded bars of the first U-shaped bracket contact the one rounded bar of the second U-shaped bracket when the lower portions and the handles of the U-shaped brackets are bought together.

9. The compression apparatus of claim 8, wherein the upper portions of the first U-shaped bracket are co-linear with the bottom portions of the second U-shaped brackets, when the compression apparatus is closed and the handles are brought together.

10. The compression apparatus of claim 8, wherein the upper portions of the second U-shaped bracket are co-linear with the bottom portions of the first U-shaped brackets, when the compression apparatus is closed and the handles are brought together.

11. The compression apparatus of claim 8, wherein the first curvature comprises roughly a 135 degree bend and the second curvature comprises a roughly 45 degree bend with regard to both the first and second U-shaped bracket.

12. The compression apparatus of claim 8, wherein the compression apparatus hingedly opens and closes by opening and closing the handles and placing a walled object between the bottom portions of the first and second U-shaped brackets, which are correspondingly separated and brought closer together.

* * * * *